United States Patent Office 3,463,040
Patented Aug. 26, 1969

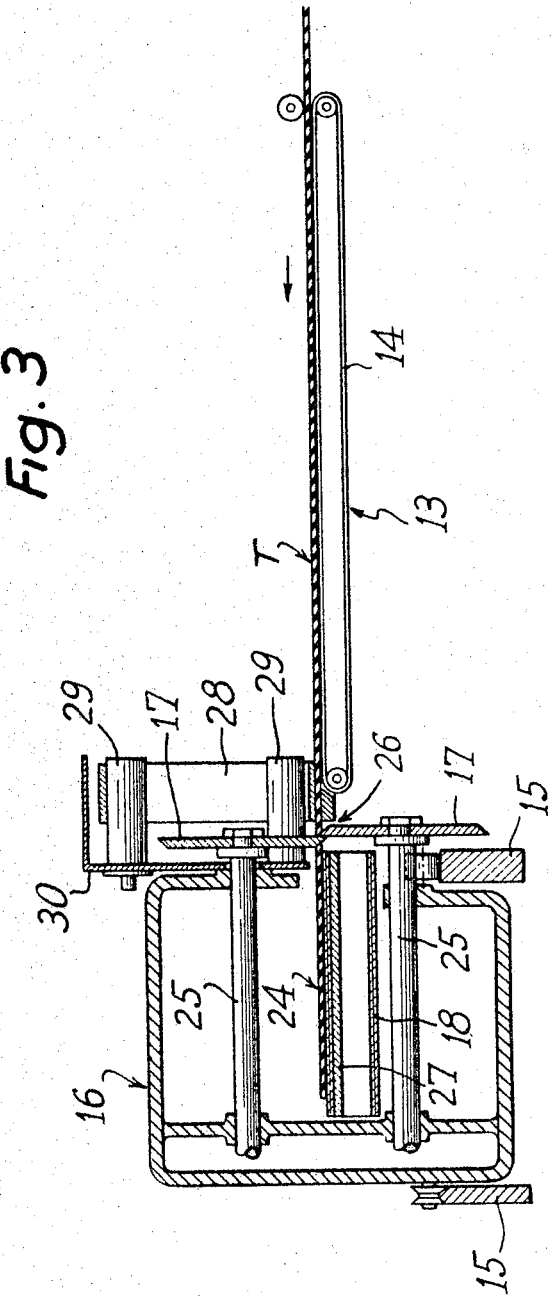

3,463,040
MACHINE FOR CUTTING SHEET MATERIALS
Jacques Pouilloux, St.-Gratien, France, assignor to Pneumatiques, Caoutchouc Manufacture et Plastiques Kleber-Colombes, Colombes, Hauts-de-Seine, France, a French body corporate
Filed Mar. 27, 1967, Ser. No. 626,170
Claims priority, application France, Mar. 25, 1966, 55,120
Int. Cl. B23d 19/00; B26d 1/18
U.S. Cl. 83—374                                    8 Claims

ABSTRACT OF THE DISCLOSURE

This invention relates to a machine for cutting sheet material of the type comprising at least one circular knife which moves transversely with respect to the sheet material and according to the invention an endless band pressure member is provided to hold the sheet material and is constituted by a member that moves transversely with the circular knife and rolls along a predetermined cutting line immediately adjacent the knife. Furthermore, means are provided for resiliently applying the pressure member to the material so as to press the latter only on the reduced surface zone which moves at the same time as the knife. In this way, the application force is reduced and it becomes easier to detach the pressure member from the sheet material.

---

Figure 1:
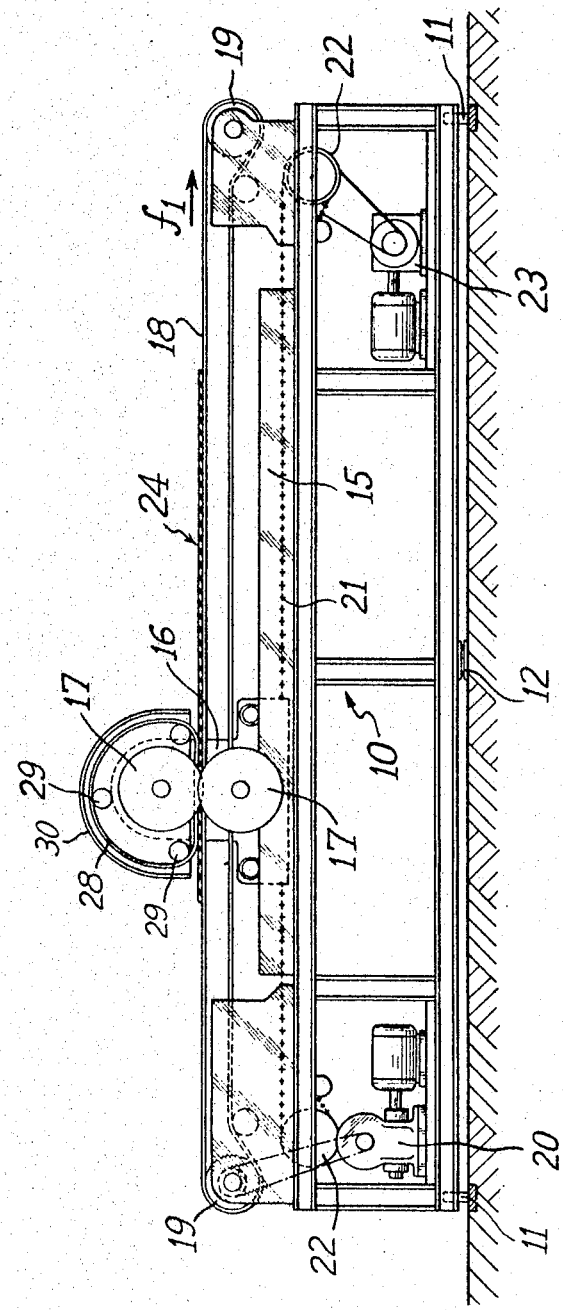

The present invention relates to improvements in machines for cutting sheet materials, particularly rubberised fabric such as "cord" fabric that is used in the manufacture of types and other rubber articles.

In known machines which are most currently used, the fabric is cut either by means of a single circular rotary knife or a rotary knife operating with a fixed counterblade, or by means of two circular rotary knives, the circular knife or knives being mounted on a carriage which can move along the transverse support. This support is orientable in order to allow cutting on the bias along different angles with respect to the longitudinal direction of the cables or strands constituting the base of the fabric.

With these machines it is generally necessary to hold the fabric to be cut very near to the cutting line in order to facilitate the action of the knives and to prevent the fabric from moving. To this end, pressure members are used which are constituted by a transverse bar applied to the fabric, parallel and as close as possible to the cutting line. A pressure member of this type is just as suitable when the fabric is constituted by fine textile cables because it does not present much resistance to the advance movement of the knives. With more resistant cloths constituted by larger cables or by metallic cables, a pressure member of this type is not very suitable because the force necessary for exerting a unitary pressure which is sufficient to hold the fabric becomes very high and this necessitates that the pressure member be very large.

In addition, as the fabric to be cut is coated with vulcanisable rubber with vulcanising elements added thereto, it sticks to the pressure member and it is difficult to separate it from the pressure member in order to permit a fresh advance movement of the fabric to be cut or (if the pressure member is situated downstream of the cutting line) in order to permit the discharge of the cut strip.

The invention has for an object to avoid these disadvantages and consequently to produce, in a machine for cutting cord cloth comprising at least one circular knife which can move transversely with respect to the cloth, a pressure member enabling the cloth to be held near the cutting line with a sufficient pressure but on the whole without necessitating a considerable force of application, this avoiding rendering the device heavier. It also has for an object to avoid the cloth sticking to the pressure member.

These objects are achieved by making the pressure member in the form of an endless band transversely movable with the circular knife and rolling along the cutting line, in the immediate vicinity of the knife by being resiliently applied to the fabric. In this manner, the pressure member exerts on the fabric a pressure which is localized only in a reduced zone which moves at the same time as the knife. This pressure can thus be sufficient to hold the cloth without necessitating a high force of application. On the other hand, the rolling movement of the pressure member enables it to detach itself more easily from the cloth.

The endless band pressure member can be produced in various forms but most advantageously in the form of a flexible endless belt which is resiliently applied to the fabric by rolling in the manner of a caterpillar. With such a pressure member the fabric can be held on either side of the knives in a zone which extends a little in front of and a little behind the cutting point.

According to other features of the invention, the movable pressure member can be placed upstream or downstream with respect to the cutting line so as to hold the fabric to be cut or the cut strip. If desired, two pressure members may be disposed on either side of the cutting line.

Figure 4:
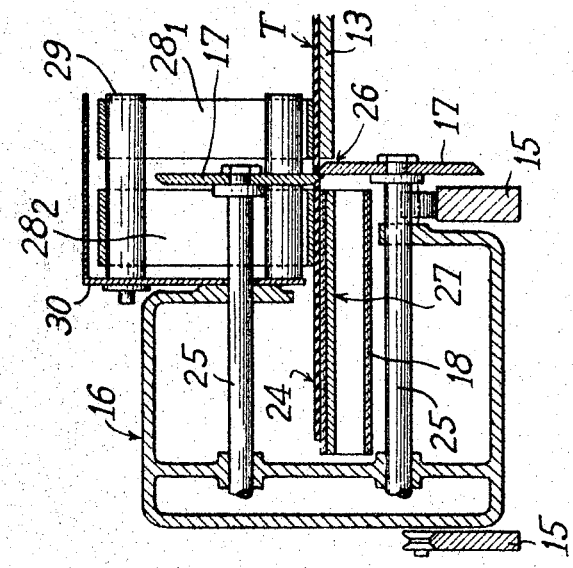
Figure 2:
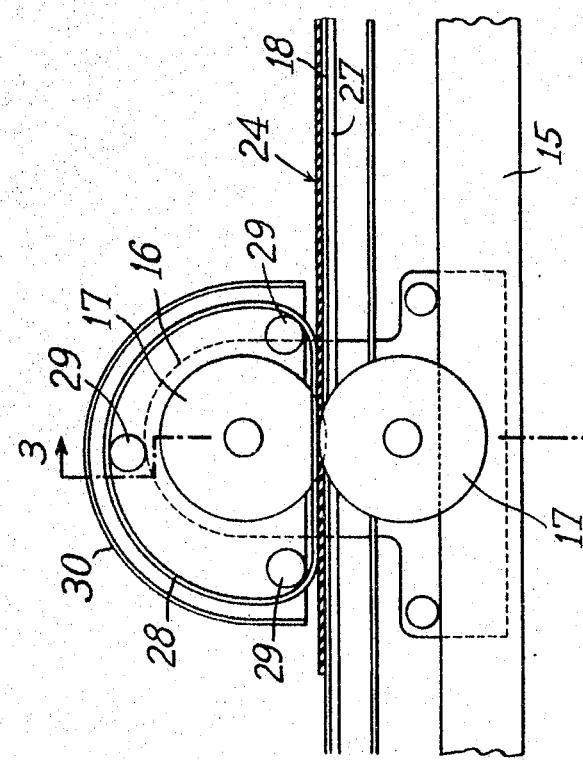

In order that the invention may be more clearly understood, reference will now be made to the accompanying drawings which show certain embodiments thereof by way of example, and in which:

FIGURE 1 shows an elevational view of an actual cutting device in front of which a supply table is locatable but not shown, FIGURE 2 shows a part elevational view showing the carriage in section to a larger scale, FIGURE 3 shows a sectional view along the line 3—3 of FIGURE 2; and FIGURE 4 shows a sectional view, similar to FIGURE 3, but showing a modification.

The cutting device shown in these drawings comprises a frame 10 of elongated shape carried at each end by rollers 11 and at the centre by a bearing 12 so as to be able to pivot about a vertical axis in order to adjust the angle of cut of the fabric. This fabric T is guided to the cutting device by a table 13 which is placed upstream with respect to FIGURE 1 and which can in particular be constituted by an endless belt or by a series of parallel endless belts as shown schematically at 14 in FIGURE 3.

The frame 10 carries two parallel rails such as 15 on which there may be horizontally displaced a carriage 16 carrying the knives 17 and in its upper part a conveyor 18 constituted by an endless belt serving to receive and carry off the cut belt of fabric 24. The belt of the conveyor 18 is wound on two rollers 19 placed at each end of the frame. One of these rollers is driven by a motor unit 20 embodying reduction gearing, and controlled by the operator or automatically when the carriage 16 arrives at the end of its travel. The carriage 16 is itself connected to a chain 21 which is wound on return pinions 22, one of which is driven alternately in one direction and the other from a motor unit 23 with reduction gearing, which motor may be controlled manually or automatically. The carriage is in the general form of a swan's neck or a C so as to allow the passage to the two horizontal ends of the discharge conveyor 18 (FIGURES 2 and 3).

In the two examples shown, the fabric T is cut by means of two circular knives 17 mounted at the end of two parallel horizontal shafts 25 in alignment along a vertical plane and rotating in bearings of the casing of the carriage 16. The distance between the two shafts 25 is slightly shorter than the diameter of the knives 17 and at least one of the shafts 25 is urged axially in order that the knives are in contact with one another along one of their vertical faces in the narrow gap 26 between the front transverse edge of the lead-in table 13 and a longitudinal edge of the discharge conveyor 18. In line with the table 13, the upper end of the conveyor 18 is held by a support plate 27. As a modification, the fabric could be cut by means of a single circular knife such as 17 or even by an assembly constituted by a single circular knife 17, bearing upon a fixed counter-blade extending longitudinally in the gap 26 in place of the lower knife. In the two cases, the single circular knife is carried by the carriage 16. Whatever cutting device is used, the operation remains substantially the same. The fabric T supplied onto the table 13 is advanced above the conveyor 18 whilst the carriage 16 is at one end of its travel and whilst the conveyor 18 is stationary. Then the displacement of the carriage 16 is controlled in order to cut the fabric in the gap 26 whereafter the conveyor 18 is set into operation in order to carry the strip of cut cloth 24 away towards f1.

In the embodiment illustrated in FIGURES 2 and 3, the pressure member serving to hold the fabric near the knives 17 during the cutting operation, is constituted by and endless belt 28 passing over idling rollers 29 supported parallel to the shafts 25 by a plate 30 fixed to the carriage 16.

Two of these rollers 29 are placed on either side of the knives 17 slightly above the fabric and a third roller is placed above the upper knife as shown in FIGURES 1 and 2.

The belt 28 is a flexible hoop having, before assembly, a substantially circular form. After assembly, it is constrained by the two lower guiding rollers to be resiliently applied against the front edge of the table 13 along a certain elongated zone of contact extending on either side of the vertical plane passing through the axes of the knives 17. When the carriage moves, this belt 28 rolls in the manner of a caterpillar by gripping the fabric T between it and the edge of the table 13 just in the vicinity of the knives so as to avoid any displacement of the fabric during the cutting action. The width of the belt 28 may be chosen in order to obtain the tightening pressure sufficient for holding the fabric. It is advantageous if the belt is situated as close as possible to the cutting line.

Instead of placing the pressure belt 28 as in FIGURE 3 upstream of the cutting line so as to tighten the fabric T against the edge of the table 13, this belt could be mounted downstream of the cutting line so as to press the fabric against the discharge conveyor 18. As shown in FIGURE 4, two pressure belts $28_1$ and $28_2$ may be provided, and positioned on either side of the cutting line in order to hold the fabric on both sides of the knives 17. As has already been indicated above, the pressure member according to the invention enables the fabric to be cut to be held only in a reduced surface zone which move at the same time as the cutting members, instead of holding the fabric over its whole length. This enables a sufficient unitary pressure to be exerted on the fabric near the knives in order to ensure a good holding of the fabric and without this necessitating a considerable force of application. Consequently, the carriage and its support members may be of relatively light construction, this being more economical and more advantageous from the point of view of inertia of the moving part. Another advantage over the pressure members with transverse bar of known type is that the pressure member is here simply driven with the carriage so that it is not necessary to have special mechanisms for applying and for removing the pressure member. In fact, the simple detachment of the carriage at the end of each travel enables the pressure belt to be removed from the passage of the fabric advancing above the conveyor 18 in order to be cut. Finally, the rolling movement of the pressure on the fabric facilitates the unsticking of the fabric from the surface of the pressure member.

I claim:
1. A machine for cutting sheet material, especially of the cord fabric type, said machine comprising at least one circular knife which moves transversely with respect to the sheet material, and a pressure member to hold the sheet material, said pressure member being transversely movable with said circular knife and means for resiliently applying said pressure member to said material so as to press said material only in a reduced surface zone which moves at the same time as said knife, said pressure member comprising an endless belt passing over guide rollers, and rolling along said sheet material in the manner of a caterpillar along an elongated zone parallel to and adjacent a predetermined cutting line and extending a little in front of and a little behind the cutting point of the knife, thus enabling the necessary force of application to be reduced and the detachment of the pressure member with respect to the sheet material to be facilitated.

2. A machine according to claim 1, wherein at least one rotary circular knife is mounted on a transversely movable carriage and wherein said pressure member is mounted on said carriage for displacement therewith in the immediate vicinity of said at least one knife.

3. A machine according to claim 1, wherein said endless belt is constituted by a flat flexible hoop having, in the rest position, a substantially circular shape so that, in operation, it is elastically flattened on the sheet material near said at least one knife.

4. A machine according to claim 1, wherein two knives are provided, one above the other, and said pressure member is guided by two rollers situated on either side of said knives, slightly above the sheet material, and by a third roller situated above the upper knife.

5. A machine according to claim 1, wherein said pressure member is disposed upstream of said cutting line.

6. A machine according to claim 1, which includes two pressure members disposed on either side of said cutting line.

7. A machine according to claim 3, wherein two knives are provided, one above the other, and said pressure member is guided by two rollers situated on either side of said knives, slightly above the sheet material, and by a third roller situated above the upper knife.

8. A machine according to claim 4, wherein said pressure member is disposed upstream of said cutting line.

References Cited

UNITED STATES PATENTS

| 1,156,224 | 10/1915 | Harwood | 83—485 X |
| 2,503,353 | 4/1950 | Pugh | 83—485 X |
| 2,777,521 | 1/1957 | Tanis | 83—488 X |
| 2,969,930 | 1/1961 | Zernov | 83—487 X |

FOREIGN PATENTS

| 490,561 | 2/1953 | Canada. |

JAMES M. MEISTER, Primary Examiner

U.S. Cl. X.R.

83—487, 614